(12) United States Patent
Mhaskar et al.

(10) Patent No.: US 11,933,415 B2
(45) Date of Patent: Mar. 19, 2024

(54) VALVE WITH EROSION RESISTANT FLOW TRIM

(71) Applicant: WEATHERFORD TECHNOLOGY HOLDINGS, LLC, Houston, TX (US)

(72) Inventors: Nauman H. Mhaskar, Houston, TX (US); Don A. Hopmann, Alvin, TX (US); Sebastiaan J. Wolters, Kingwood, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 22 days.

(21) Appl. No.: 17/704,193

(22) Filed: Mar. 25, 2022

(65) Prior Publication Data
US 2023/0304594 A1    Sep. 28, 2023

(51) Int. Cl.
| | | |
|---|---|---|
| *F16K 11/07* | (2006.01) | |
| *E21B 34/02* | (2006.01) | |
| *E21B 34/14* | (2006.01) | |
| *F16K 25/04* | (2006.01) | |

(52) U.S. Cl.
CPC ............ *F16K 25/04* (2013.01); *E21B 34/025* (2020.05); *E21B 34/14* (2013.01); *F16K 11/0708* (2013.01)

(58) Field of Classification Search
CPC ........ E21B 34/14; E21B 34/025; E21B 34/12; F16K 25/04; F16K 11/0708; F16K 11/0712; F16K 11/0716; F16K 47/04; F16K 47/08
See application file for complete search history.

(56) References Cited

U.S. PATENT DOCUMENTS

| | | | |
|---|---|---|---|
| 5,325,917 A | 7/1994 | Szarka | |
| 5,957,208 A | 9/1999 | Schnatzmeyer | |
| 6,006,838 A | 12/1999 | Whiteley et al. | |
| 6,044,908 A * | 4/2000 | Wyatt | E21B 34/14 |
| | | | 277/648 |
| 7,377,322 B2 * | 5/2008 | Hofman | E21B 43/261 |
| | | | 166/120 |
| 7,775,285 B2 | 8/2010 | Surjaatmadja et al. | |
| 8,291,982 B2 | 10/2012 | Murray et al. | |

(Continued)

FOREIGN PATENT DOCUMENTS

| | | | | |
|---|---|---|---|---|
| CA | 2809804 A1 * | 6/2014 | ............. | E21B 34/06 |
| DE | 4107083 A1 * | 9/1992 | .......... | F16K 11/0712 |

(Continued)

OTHER PUBLICATIONS

International Search Report with Written Opinion dated Feb. 13, 2023 for PCT Patent Application No. PCT/IB2023/050229, 11 pages.

(Continued)

*Primary Examiner* — Hailey K. Do
(74) *Attorney, Agent, or Firm* — Smith IP Services, P.C.

(57) ABSTRACT

A valve assembly can include a housing having multiple longitudinally spaced apart ports, a sleeve longitudinally displaceable in the housing, and at least one deflector ring configured to block flow through an annular space formed between the housing and an outer surface of the sleeve. The deflector ring is positioned longitudinally between an adjacent pair of the ports. Another valve assembly can include a housing having a port, a sleeve longitudinally displaceable in the housing, and a nozzle having an orifice in communication with the port. The nozzle is secured to the housing.

19 Claims, 7 Drawing Sheets

(56) References Cited

U.S. PATENT DOCUMENTS

| | | | |
|---|---|---|---|
| 8,550,176 B2 * | 10/2013 | Knobloch, Jr. | ....... E21B 34/142 |
| | | | 166/334.1 |
| 8,876,083 B2 | 11/2014 | Black et al. | |
| 9,103,207 B2 * | 8/2015 | Richards | ................ E21B 43/08 |
| 9,464,507 B2 | 10/2016 | Tips et al. | |
| 9,593,559 B2 | 3/2017 | Yeh et al. | |
| 9,714,557 B2 | 7/2017 | Garcia | |
| 9,732,587 B2 | 8/2017 | Patwa et al. | |
| 10,563,481 B2 | 2/2020 | Richards | |
| 11,041,358 B2 * | 6/2021 | Jones | ................... F16J 15/0806 |
| 2018/0328139 A1 * | 11/2018 | Mhaskar | ............... E21B 34/063 |
| 2019/0063185 A1 | 2/2019 | Kshyk et al. | |

FOREIGN PATENT DOCUMENTS

| | | | | |
|---|---|---|---|---|
| GB | 2592427 A | * | 9/2021 | ............. E21B 21/10 |
| WO | 2008032272 A2 | | 3/2008 | |

OTHER PUBLICATIONS

Surface Technology, Inc.; "Composite Diamond Coating", company product description via www.surfacetechnology.com, dated 2019, 5 pages.

Nevada Thermal Spray Tech. "Silicon Carbide (SiC) Coatings", company product description via www.nevadathermalspray.com, downloaded prior to Mar. 25, 2022, 3 pages.

3 Better Diamond; "Polycrystalline Diamond Compact (PDC Cutter)", company product description via www.3betterdiamond.com, downloaded prior to Mar. 25, 2022, 2 pages.

Wikipedia; "Tungsten carbide", encyclopedia description, dated Feb. 3, 2022, 10 pages.

* cited by examiner

VALVE WITH EROSION RESISTANT FLOW TRIM

BACKGROUND

This disclosure relates generally to equipment utilized and operations performed in conjunction with a subterranean well and, in examples described below, more particularly provides a downhole valve with erosion resistant flow trim.

Valves used in well operations are many times exposed to erosive fluid flow. The fluid flow can cause erosion of critical components of a valve necessary for regulating or controlling the fluid flow. Maintenance and repair costs can be quite expensive, especially if the valve is deployed downhole.

Therefore, it will be readily appreciated that improvements are continually needed in the art of designing, constructing and utilizing valves subject to erosive fluid flow. These improvements may be incorporated into a variety of different types of valves.

DETAILED DESCRIPTION

Figure 1:
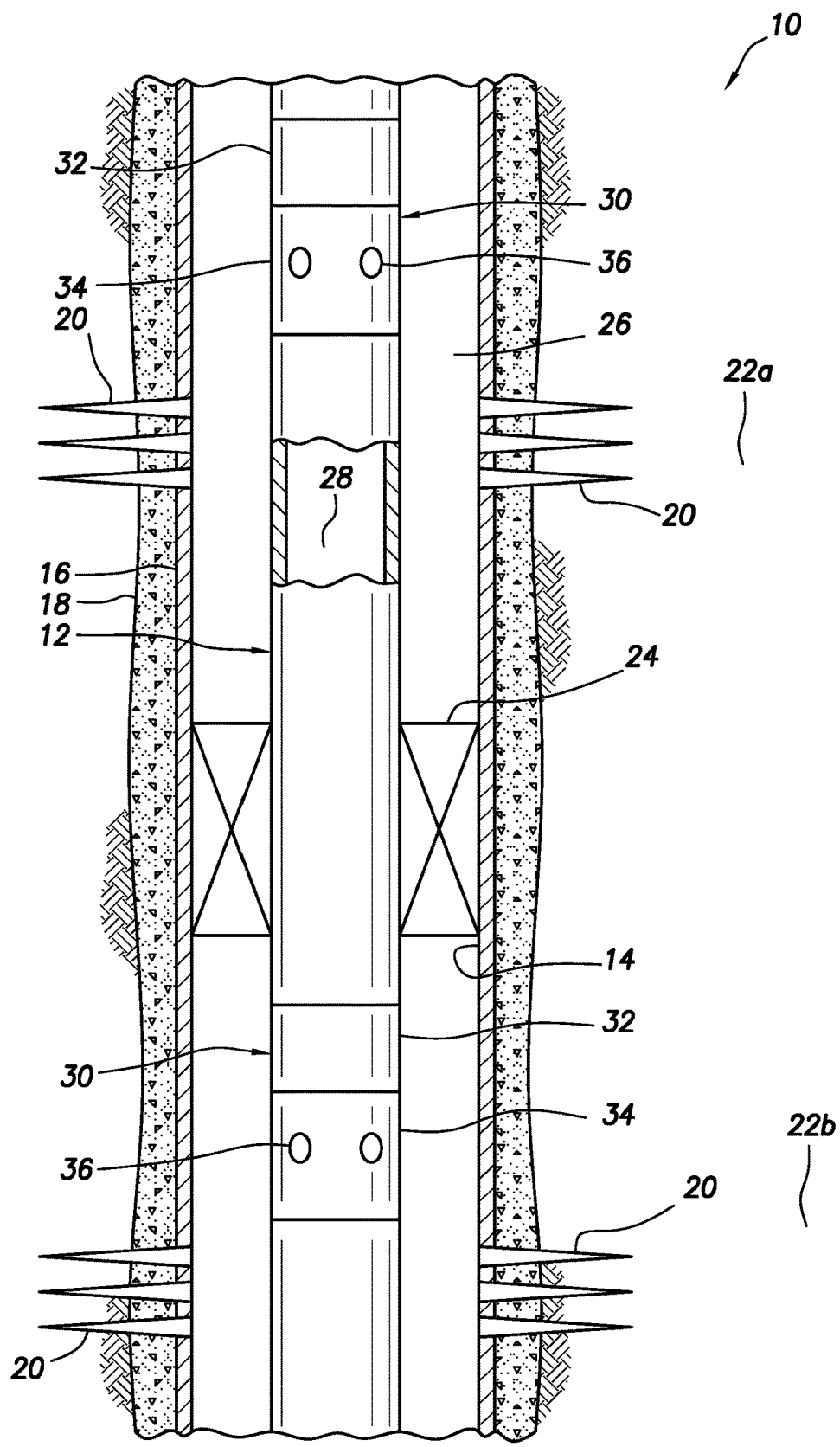
FIG. 1 is a representative partially cross-sectional view of an example of a well system and associated method which can embody principles of this disclosure.

Representatively illustrated in FIG. 1 is a system 10 for use with a subterranean well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a tubular string 12 is positioned in a generally vertical wellbore 14 lined with casing 16 and cement 18. Perforations 20 are formed through the casing 16 and cement 18, and into formation zones 22a,b penetrated by the wellbore 14. A packer 24 isolates the zones 22a,b from each other in an annulus 26 formed radially between the tubular string 12 and the wellbore 14.

In other examples, the wellbore 14 may not be generally vertical or lined with casing and cement. The packer 24 could be set in an uncased or open hole. Flowpaths other than perforations (such as, perforated liner, casing valves, etc.) may be used for permitting flow between the zones 22a,b and the annulus 26. Thus, the scope of this disclosure is not limited to any particular details of the system 10 depicted in FIG. 1 or described herein.

As depicted in FIG. 1, the tubular string 12 includes valve assemblies 30a,b for selectively controlling fluid communication between the annulus 26 and an interior flow passage 28 of the tubular string 12. Each valve assembly 30a,b includes an actuator 32 and a valve 34. The actuator 32 may be any type of actuator, such as, a hydraulic or electrical actuator, and may be controlled via remote wireless telemetry or via wires extending to surface. The scope of this disclosure is not limited to any particular type of actuator or technique for controlling operation of the actuator.

The valve 34 selectively permits and prevents fluid flow between the annulus 26 and the flow passage 28. In some examples, the valve 34 may include features that enable variable restriction or choking of the fluid flow between fully open and fully closed configurations of the valve. The fluid flow may be directed outward or inward through ports 36 of the valve 34.

In examples described below, the valve assembly 30 is of the type known to those skilled in the art as an interval control valve. An interval control valve is typically used to regulate production flow from a zone or interval. However, the scope of this disclosure is not limited to interval control valves or regulation of production flow in a well.

Figure 2:
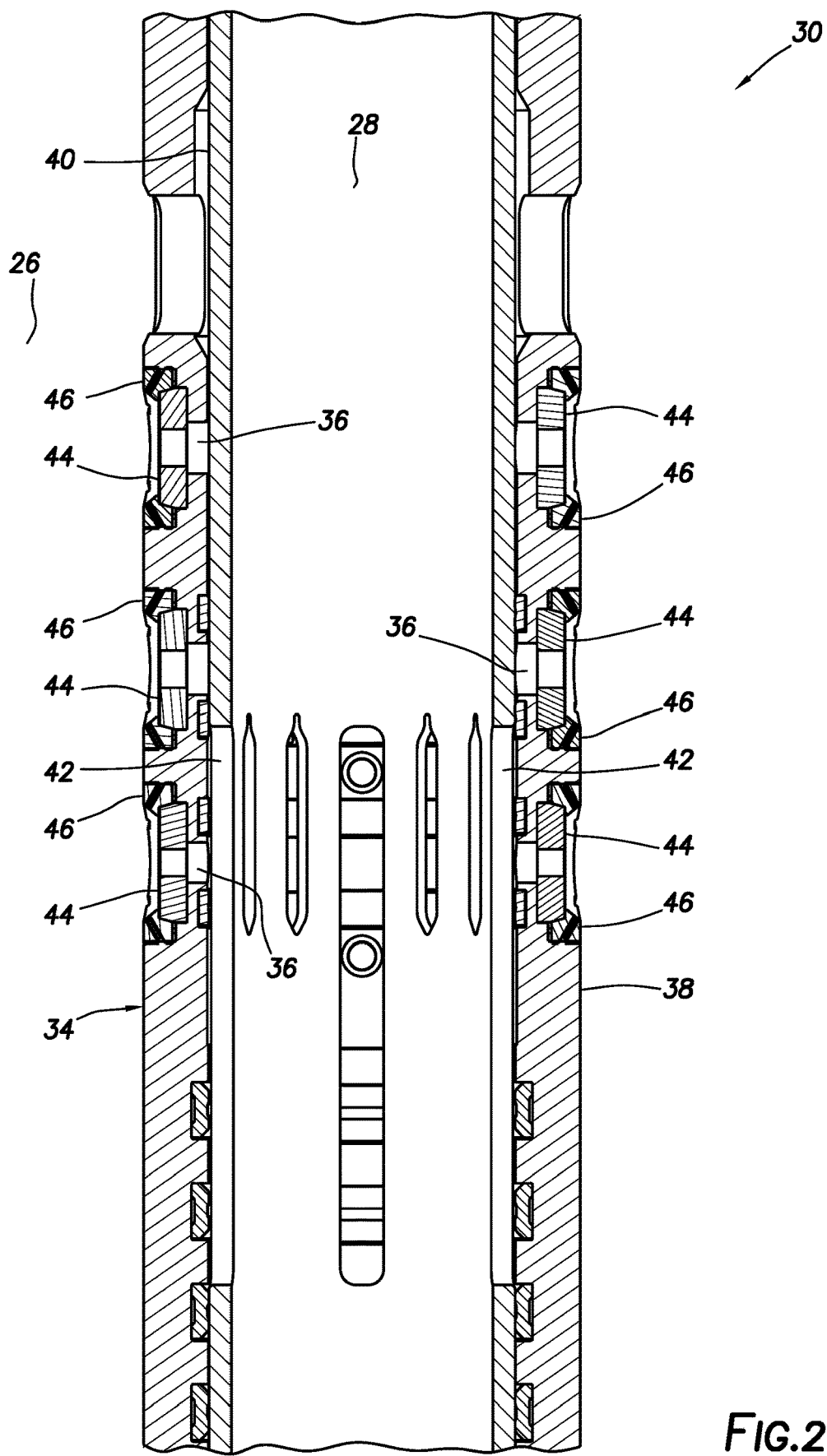
FIG. 2 is a representative cross-sectional view of an example of a valve assembly which can embody the principles of this disclosure.

Referring additionally now to FIG. 2, a cross-sectional view of an example of the valve assembly 30 is representatively illustrated. The FIG. 2 valve assembly 30 is described below as it may be used in the system 10 and method of FIG. 1, but it should be understood that the valve assembly may be used with other systems and methods.

In the FIG. 2 example, a generally tubular outer housing 38 is configured for connection in the tubular string 12. Note that the actuator 32 is not depicted in FIG. 2. The actuator 32 may be integrated with the valve 34 in some examples, or in other examples the actuator may be separately connected to the valve 34.

A generally tubular sleeve 40 is longitudinally reciprocable in the outer housing 38. The actuator 32 can longitudinally displace the sleeve 40 relative to the housing 38. Longitudinally elongated openings 42 formed in the sleeve 40 can align with various ones of the ports 36, to thereby permit or regulate flow between the flow passage 28 and the annulus 26 external to the valve 34, as the sleeve 40 is displaced longitudinally relative to the housing 38.

To prevent or minimize erosion of the ports 36, nozzles 44 are secured in the housing 38. In this example, the nozzles 44 are secured without welding by means of retainers 46. The retainers 46 are threaded into the housing 38. In other examples, other types of mechanical fasteners may be used, or the retainers 46 could otherwise secure the nozzles 44 without use of any welds.

Figure 3:
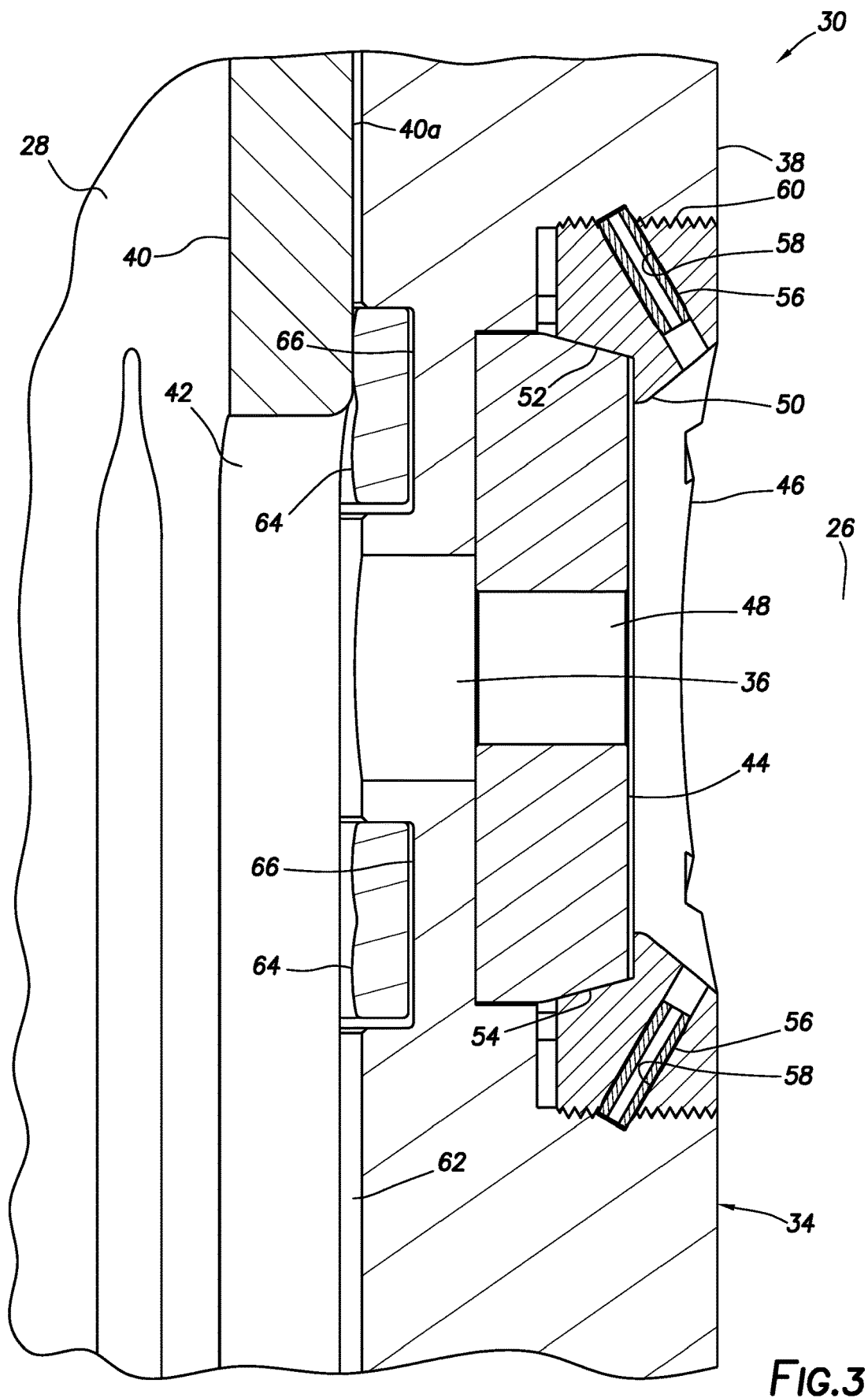
FIG. 3 is a representative cross-sectional view of a flow trim of the FIG. 2 valve assembly.

Referring additionally now to FIG. 3, a cross-sectional view of an example of a flow trim portion of the FIG. 2 valve assembly 30 is representatively illustrated. In this view, the manner in which the nozzle 44 is retained in the housing 38 can be more clearly seen.

In the FIG. 3 example, the nozzle 44 is generally annular-shaped, with an orifice 48 formed through the nozzle. The orifice 48 in this example has a diameter less than a diameter of the port 36, so that the port (and the surrounding wall of the housing 38) is protected from erosive fluid flow. Preferably, the nozzle 44 is made of a suitably erosion-resistant material, such as, polycrystalline diamond compact (PDC) or a combination of PDC and tungsten carbide elements.

The retainer 46 is threaded into the housing 38, so that the nozzle 44 is "sandwiched" between the retainer and the housing. An inwardly extending lip 50 formed on the retainer 46 overlies an outer portion of the nozzle 44 and prevents the nozzle from displacing radially outward. In addition, a frusta-conical surface 52 formed in the retainer 46 overlies and contacts a frusta-conical surface 54 formed on the nozzle 44. Thus, even if the lip 50 is eroded by the fluid flow, the contact between the surfaces 52, 54 will continue to retain the nozzle 44 in the housing 38.

In this example, the retainer 46 is threaded into the housing 38 to secure the nozzle 44 therein, and then spring pins 56 are driven into holes 58 extending through the retainer and into engaged threads 60 of the retainer and housing. The holes 58 may be drilled into the threads 60 of the housing 38 after the retainer 46 is fully threaded into the housing.

In the configuration of FIG. 3, the aligned port 36, opening 42 and orifice 48 allows fluid flow between the flow passage 28 and the annulus 26. However, it is desired in this example to block the fluid flow to or from other ports 36 or nozzles 44 of the valve 34, in order to minimize erosive flow through an annulus 62 formed radially between the sleeve 40 and the housing 38. To block flow through the annulus 62, at least one generally annular shaped flow deflector 64 is positioned between adjacent pairs of the longitudinally spaced apart ports 36.

The flow deflectors 64 are carried in annular grooves 66 formed in the housing 38. In the FIG. 3 example, the annular grooves 66 longitudinally straddle the port 36. An upper one of the flow deflectors 64 blocks fluid flow through the annulus 62.

Figure 4:
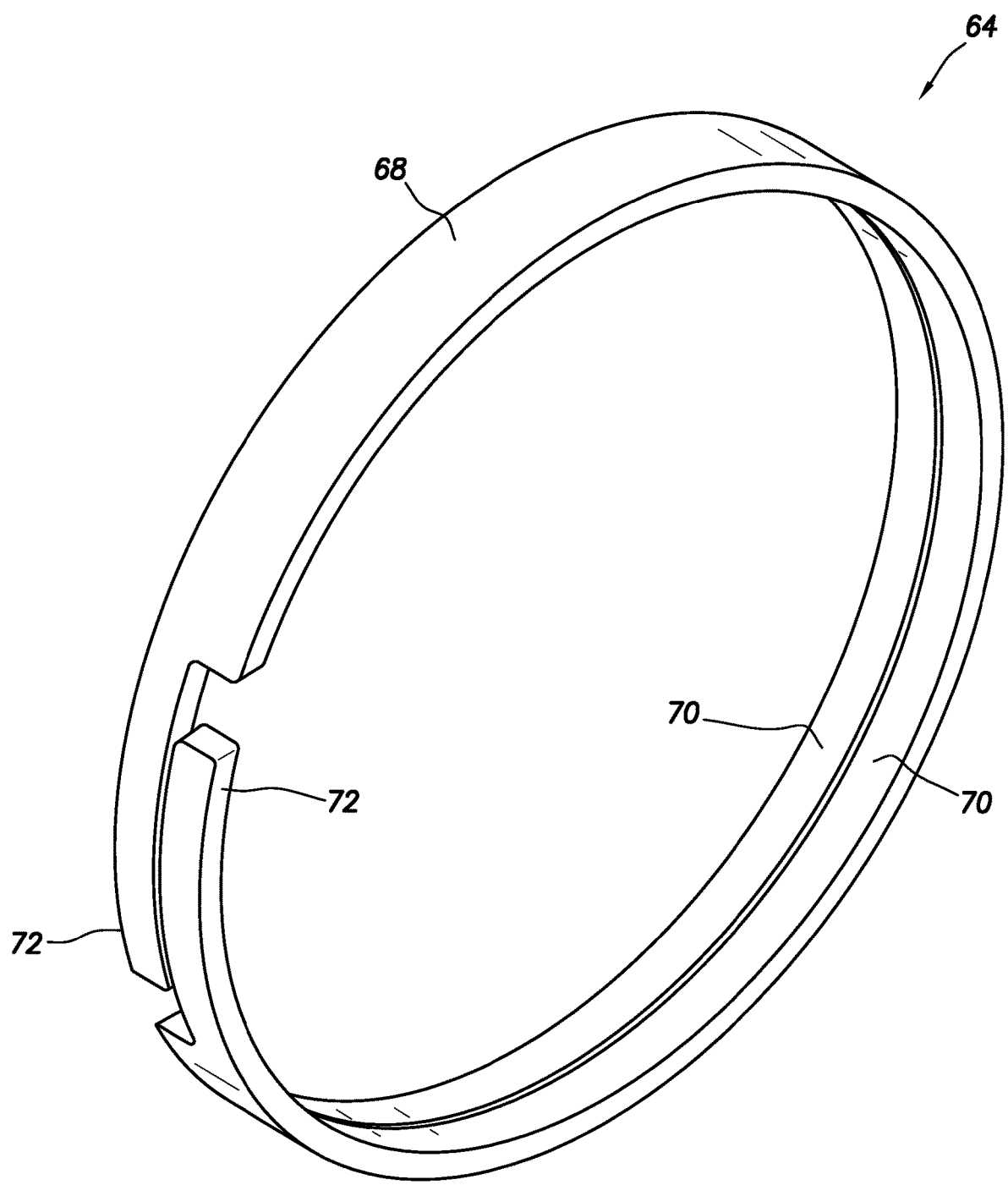
FIG. 4 is a representative perspective view of an example of a deflector ring that may be used in the FIG. 3 flow trim.

Referring additionally now to FIG. 4, a perspective view of one of the deflector rings 64 is representatively illustrated, apart from the remainder of the valve assembly 30. The deflector ring 64 is depicted in FIG. 4 prior to its assembly with the valve 34, and in a relaxed state (e.g., with no externally applied force or induced stress).

In the FIG. 4 relaxed state of the deflector ring 64, a radially outermost external surface 68 of the deflector ring has a certain diameter, and radially innermost internal surfaces 70 have another diameter. The diameter of the surfaces 70 in the relaxed state of the deflector ring 64 is less than a diameter of an external surface 40a of the sleeve 40 (see FIG. 3) which the surfaces 70 contact in operation of the valve 34. Thus, the diameter of the surfaces 70 in operation is greater than the diameter of the surfaces 70 in the relaxed state of the deflector ring 64.

In order to provide for this increase in diameter of the surfaces 70, the deflector ring 64 is configured to be circumferentially resilient. In the FIG. 4 example, the deflector ring 64 is divided or split between opposite circumferential ends 72 of the ring. In this manner, the deflector ring 64 is made circumferentially discontinuous, so that the ends 72 can displace relative to each other.

Preferably, the deflector ring 64 is made of a material that is suitably resilient and erosion resistant. For example, the deflector ring 64 material can comprise a metal (such as, a nickel and/or chromium alloy) or another non-elastomeric material. An erosion-resistant coating may be externally applied to the deflector ring 64. The erosion-resistant coating could include composite diamond and/or silicon carbide.

When the deflector ring 64 is assembled in the valve 34, it is circumferentially elongated, as mentioned above, so that the diameter of the deflector ring internal surfaces 70 increases to the diameter of the sleeve external surface 40a. Since stresses in the deflector ring 64 due to this diameter increase tend to bias the deflector ring back to its FIG. 4 relaxed state, there is an interference fit between the deflector ring and the sleeve 40.

The internal surfaces 70 are biased into contact with the sleeve external surface 40a due to this interference fit. In this manner, the deflector ring 64 is maintained in a position to most effectively block fluid flow through the annulus 62 between the sleeve 40 and the housing 38.

Figure 5:
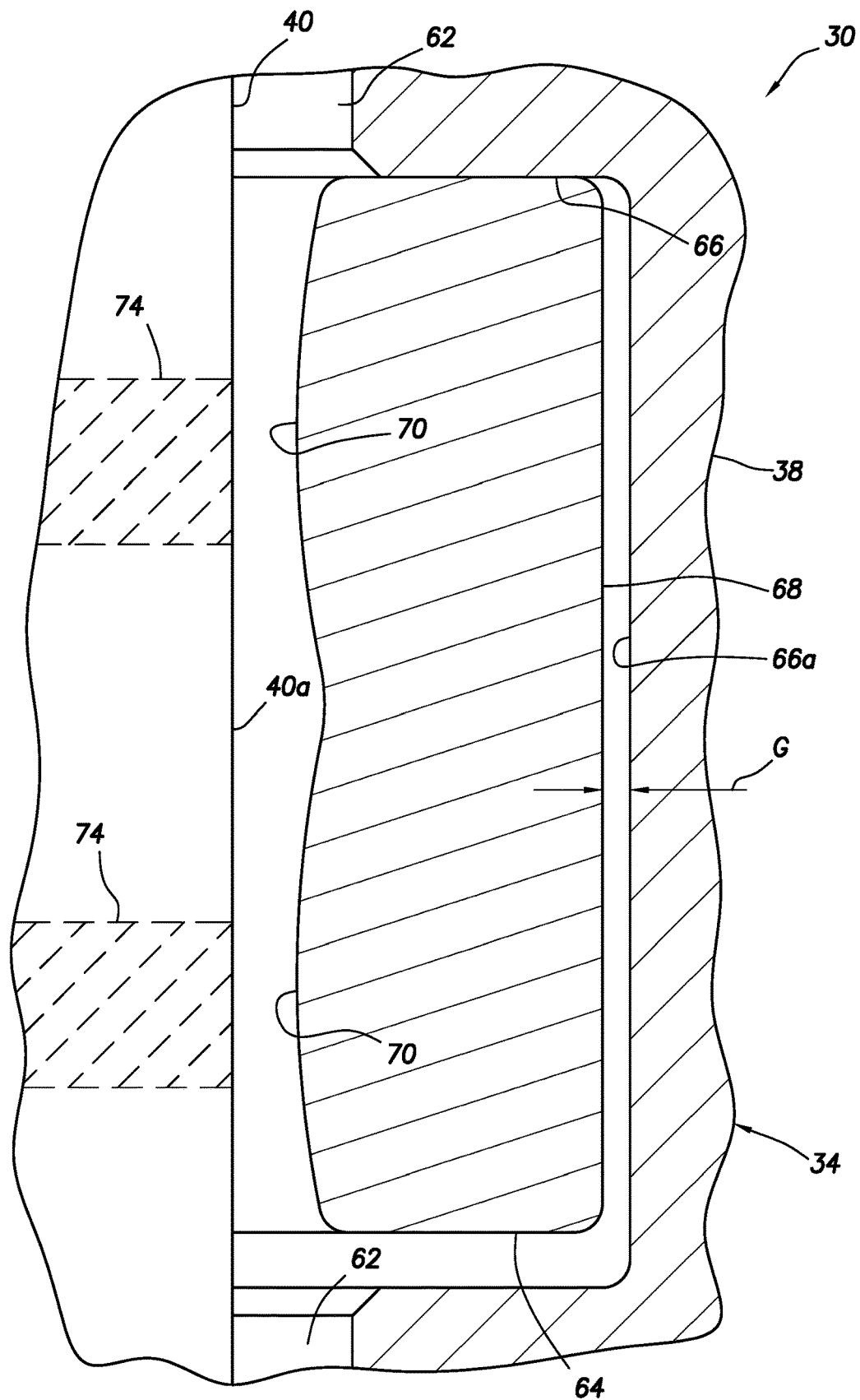
FIG. 5 is a representative partially cross-sectional view of the deflector ring in operation.

In contrast, the external surface 68 does not contact, but is instead spaced radially apart from, a radially outermost surface 66a of the groove 66 (see FIG. 5). Thus, the deflector ring 64 can expand radially outward somewhat if needed to accommodate any diameter variations on the sleeve 40.

As mentioned above, the FIG. 4 deflector ring 64 has multiple internal surfaces 70. The use of multiple internal surfaces 70 reduces a contact area between the sleeve 40 and the deflector ring 64, which can aid in resisting erosion. However, in other examples the deflector ring 64 may have only a single internal surface (see FIGS. 6 & 7).

Referring additionally now to FIG. 5, a partially cross-sectional view of one of the deflector rings 64 positioned in one of the grooves 66 is representatively illustrated. In this view, the deflector ring 64 is radially outwardly expanded for illustrative purposes, so that the deflector ring internal surfaces 70 do not contact the external surface 40a of the sleeve 40, but in actual practice there will be an interference fit and contact between the deflector ring and the sleeve after the valve 34 is assembled.

There is a radial gap G between the groove surface 66a and the external surface 68 of the deflector ring 64. In normal operation, the external surface 68 does not contact the groove surface 66a.

As indicated in FIG. 5, when the deflector ring 64 is radially inwardly retracted, the internal surfaces 70 will contact the sleeve outer surface 40a at two circumferentially extending contact areas 74. Note that the sum of the two contact areas 74 can be less than the contact area if only a single internal surface 70 is formed in the deflector ring 64 (as in the FIGS. 6 & 7 example described below).

Figure 6:
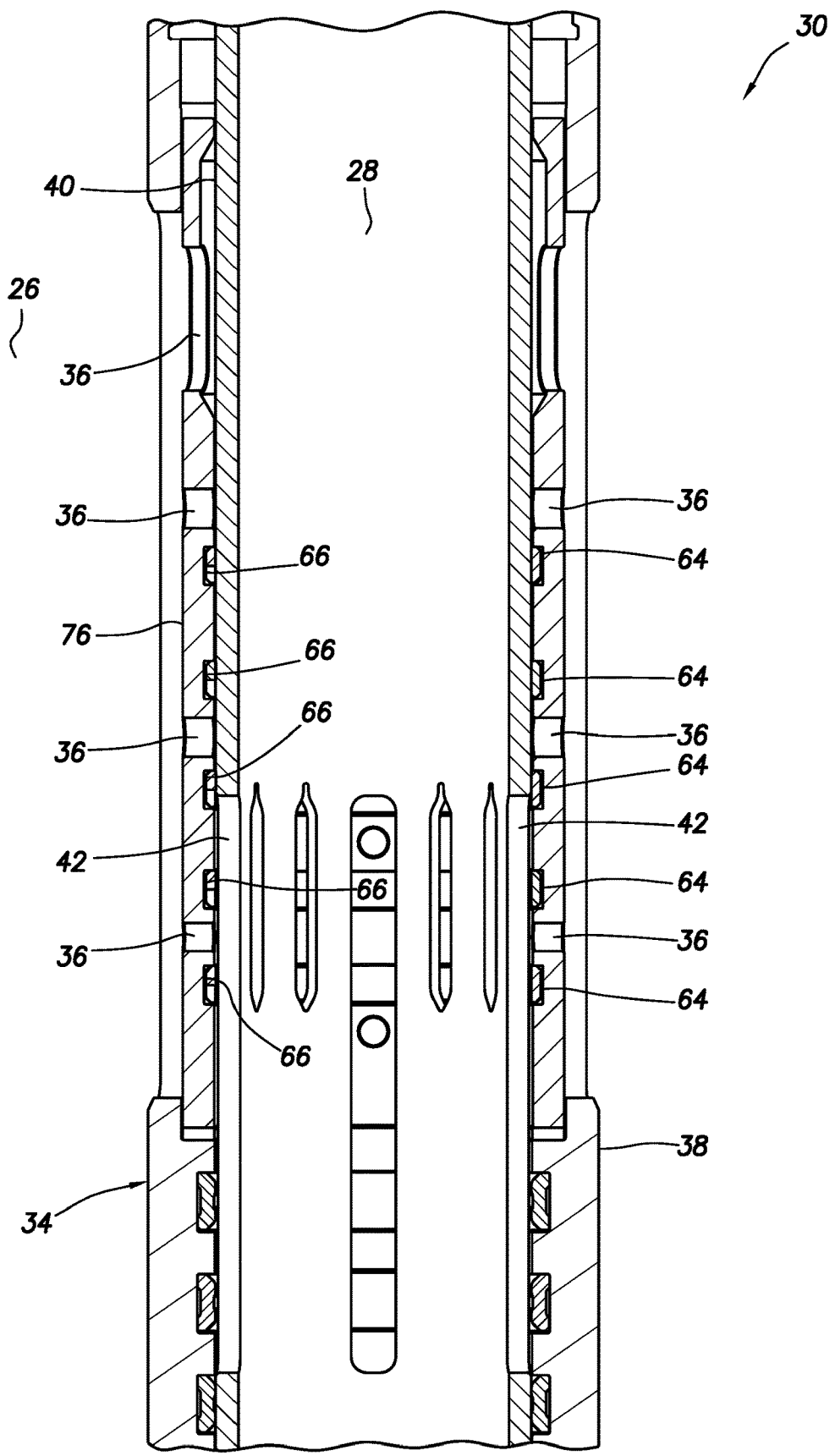
FIG. 6 is a representative cross-sectional view of another example of a valve assembly which can embody the principles of this disclosure.

Referring additionally now to FIG. 6, a cross-sectional view of another example of the valve assembly 30 is representatively illustrated. The FIG. 6 valve assembly 30 is similar in many respects to the FIGS. 2-5 valve assembly, and so the same reference numerals are used in FIG. 6 to indicate elements that are similar to elements described above.

One difference in the FIG. 6 example is that the nozzles 44 are not used. Instead, the housing 38 includes an annular insert 76 in which the ports 36 are formed. The insert 76 can be made of a suitably erosion resistant material (such as, tungsten carbide). Thus, a separate orifice 48 formed in an erosion resistant nozzle 44 is not needed to resist erosion of a port 36 (or the port and orifice could be considered as combined in the insert 76).

The grooves 66 for the deflector rings 64 are formed in the insert 76 longitudinally between adjacent pairs of the ports 36. As described below, the deflector rings 64 in the FIG. 6 example do not have multiple internal surfaces 70, but instead have a single radially innermost internal surface 70.

Figure 7:
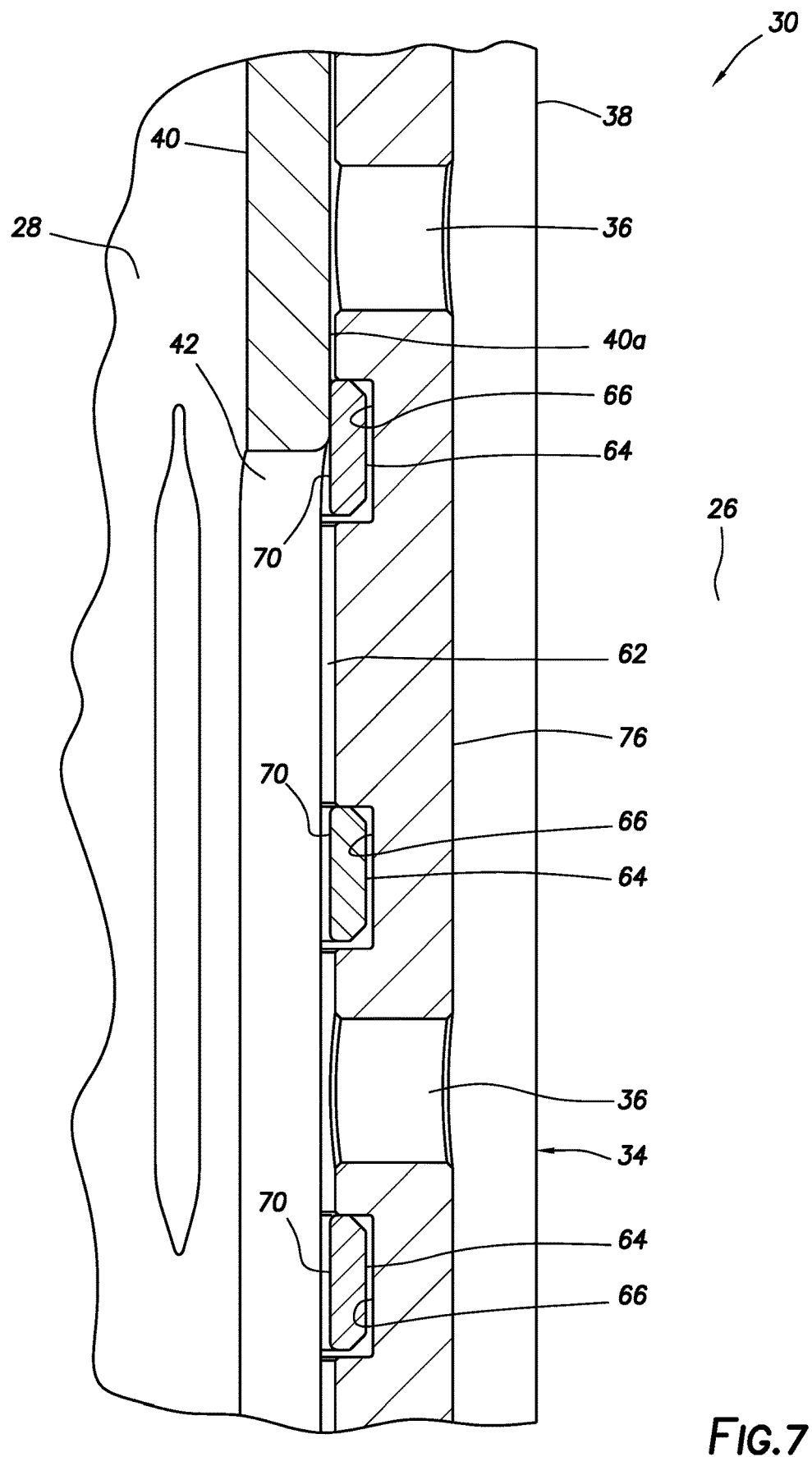
FIG. 7 is a representative cross-sectional view of a flow trim of the FIG. 6 valve assembly.

Referring additionally now to FIG. 7, a cross-sectional view of a flow trim portion of the FIG. 6 valve assembly 30 is representatively illustrated. In this view, the manner in which the deflector rings 64 contact the outer surface 40a of the sleeve 40 can be more clearly seen.

As mentioned above, each deflector ring 64 in this example has a single internal surface 70 that contacts the sleeve outer surface 40a. As in the FIGS. 2-5 example, the FIGS. 6 & 7 deflector ring 64 is biased into contact with the sleeve outer surface 40a due to an interference fit between the deflector ring 64 and the sleeve 40.

It may now be fully appreciated that the above disclosure provides significant advancements to the art of controlling fluid flow in a well. In examples described above, the valve assembly 30 has features that resist erosive damage to flow trim and other portions of the valve 34.

The above disclosure provides to the art a valve assembly 30 including a housing 38 having multiple longitudinally spaced apart ports 36, a sleeve 40 longitudinally displaceable in the housing 38, and at least one deflector ring 64 configured to block flow through an annulus 62 formed between the housing 38 and an outer surface 40a of the sleeve 40. The deflector ring 64 is positioned longitudinally between an adjacent pair of the ports 36.

An interference fit may be formed between the deflector ring 64 and the outer surface 40a of the sleeve 40. The deflector ring 64 may be carried in an annular groove 66 formed in the housing 38, and an annular gap G may be formed between a radially outermost surface 68 of the deflector ring 64 and a radially outermost surface 66a of the groove 66.

The deflector ring 64 may comprise a circumferentially resilient metal ring. The deflector ring 64 may be circumferentially discontinuous.

A material of the deflector ring 64 may be selected from nickel alloys, chromium alloys and non-elastomeric materials. The deflector ring 64 may have an erosion-resistant coating. The erosion-resistant coating may be selected from composite diamond and silicon carbide coatings.

Multiple circumferential contact areas 74 may be formed between the sleeve 40 and each deflector ring 64.

The housing 38 may comprise an annular tungsten carbide insert 76, with the ports 36 being formed in the insert 76.

Also provided to the art by the above disclosure is a valve assembly 30 comprising: a housing 38 having a port 36; a sleeve 40 longitudinally displaceable in the housing 38; and a nozzle 44 having an orifice 48 in communication with the port 36. The nozzle 44 is secured to the housing 38.

The port 36 may be positioned radially between the sleeve 40 and the orifice 48.

A retainer 46 may be used to secure the nozzle 44 to the housing 38. A frusta-conical surface 52 of the retainer 46 may contact a frusta-conical surface 54 of the nozzle 44.

A spring pin 56 may extend through the retainer 46 and into the housing 38.

The nozzle 44 may comprise a material selected from polycrystalline diamond compact and tungsten carbide. The nozzle 44 may be secured to the housing 38 without a weld.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," "upward," "downward," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A valve assembly for use with a subterranean well, the valve assembly comprising:
   a housing having multiple longitudinally spaced apart ports;
   a sleeve longitudinally displaceable in the housing; and
   a deflector ring configured to block flow through an annulus formed between the housing and an outer surface of the sleeve, the deflector ring being positioned longitudinally between an adjacent pair of the ports, in which the deflector ring is carried in an annular groove formed in the housing, and in which an annular gap is formed between a radially outermost surface of the deflector ring and a radially outermost surface of the groove.

2. The valve assembly of claim 1, in which an interference fit is formed between the deflector ring and the outer surface of the sleeve.

3. The valve assembly of claim 1, in which the deflector ring comprises a circumferentially resilient metal ring.

4. The valve assembly of claim 1, in which the deflector ring is circumferentially discontinuous.

5. The valve assembly of claim 1, in which a material of the deflector ring is selected from the group consisting of nickel alloy, chromium alloy and non-elastomeric material.

6. The valve assembly of claim 1, in which multiple circumferential contact areas are formed between the sleeve and the deflector ring.

7. The valve assembly of claim 1, in which the housing comprises an annular tungsten carbide insert, the ports being formed in the insert.

8. The valve assembly of claim 1, in which the valve assembly comprises multiple deflector rings configured to block flow through the annulus formed between the housing and the outer surface of the sleeve.

9. The valve assembly of claim 1, in which the deflector ring comprises an erosion-resistant coating.

10. The valve assembly of claim 9, in which the erosion-resistant coating is selected from the group consisting of composite diamond and silicon carbide.

11. A valve assembly for use in a subterranean well, the valve assembly comprising:
 a housing having a port;
 a sleeve longitudinally displaceable in the housing; and
 a nozzle having an orifice in communication with the port, in which a retainer secures the nozzle to the housing, and in which a frusta-conical surface of the retainer contacts a frusta-conical surface of the nozzle.

12. The valve assembly of claim 11, in which the port is positioned radially between the sleeve and the orifice.

13. The valve assembly of claim 11, in which a spring pin extends through the retainer and into the housing.

14. The valve assembly of claim 11, in which the nozzle comprises a material selected from the group consisting of polycrystalline diamond compact and tungsten carbide.

15. The valve assembly of claim 11, in which the nozzle is secured to the housing without a weld.

16. The valve assembly of claim 11, in which the valve assembly comprises multiple longitudinally spaced apart ports, and further comprising a deflector ring configured to impede flow through an annular space formed between the housing and an outer surface of the sleeve, the deflector ring being positioned longitudinally between an adjacent pair of the ports.

17. The valve assembly of claim 16, in which an interference fit is formed between the deflector ring and the outer surface of the sleeve.

18. The valve assembly of claim 16, in which the deflector ring is carried in an annular groove formed in the housing, and an annular gap is formed between a radially outermost surface of the deflector ring and a radially outermost surface of the groove.

19. The valve assembly of claim 16, in which the valve assembly comprises multiple deflector rings configured to impede flow through the annular space formed between the housing and the outer surface of the sleeve.

* * * * *